（12）United States Patent
Kang et al.

(10) Patent No.: US 7,324,077 B2
(45) Date of Patent: Jan. 29, 2008

(54) LIQUID CRYSTAL DISPLAY

(75) Inventors: Moon-Shik Kang, Seongnam (KR);
Inn-Sung Lee, Suwon (KR); Song-Yi Han, Yongin (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 284 days.

(21) Appl. No.: 10/521,731

(22) PCT Filed: Sep. 18, 2002

(86) PCT No.: PCT/KR02/01767

§ 371 (c)(1),
(2), (4) Date: Sep. 26, 2005

(87) PCT Pub. No.: WO2004/010208

PCT Pub. Date: Jan. 29, 2004

(65) Prior Publication Data

US 2006/0125767 A1 Jun. 15, 2006

(30) Foreign Application Priority Data

Jul. 19, 2002 (KR) ...................... 10-2002-0042653

(51) Int. Cl.
*G09G 3/36* (2006.01)

(52) U.S. Cl. ....................................... 345/87; 345/102

(58) Field of Classification Search ............ 345/87–96, 345/77, 98–102, 204–205, 207–208, 210–214, 345/690–691; 315/247; 349/61, 69, 70
See application file for complete search history.

(56) References Cited

U.S. PATENT DOCUMENTS

| | | | |
|---|---|---|---|
| 5,838,294 A | 11/1998 | Praiswater | ................... 345/102 |
| 5,844,540 A * | 12/1998 | Terasaki | ..................... 345/102 |
| 6,690,121 B1 * | 2/2004 | Weindorf | .................... 315/247 |
| 6,961,044 B2 * | 11/2005 | Woo | ........................... 345/102 |
| 2002/0130830 A1 * | 9/2002 | Park | ........................... 345/99 |

* cited by examiner

*Primary Examiner*—Richard Hjerpe
*Assistant Examiner*—Mansour M. Said
(74) *Attorney, Agent, or Firm*—MacPherson Kwok Chen & Heid LLP

(57) ABSTRACT

The present invention relates to a method of controlling luminance of a backlight based on a processed image data after receiving information of image data, in order to improve the visibility of moving picture. An inverter according to the present invention includes a first block generating a first luminance control signal with an analog value depending on the luminance control signal with a duty ratio depending on a synchronization signal. The luminance control signals generated by the respective blocks are synthesized luminance control signal. Accordingly, a liquid crystal display employing two backlight control methods can be provided. Thus, it is possible to remove the drag phenomenon of a screen and, at the same time, to improve the visibility for moving picture.

5 Claims, 3 Drawing Sheets

LIQUID CRYSTAL DISPLAY

BACKGROUND OF THE INVENTION (a) Field of the Invention

The present invention relates to a liquid crystal display capable of controlling luminance of a backlight, and more particularly to a method of controlling the luminance of a backlight in close relation to image data for improving visibility of a moving picture.

(b) Description of the Related Art

In recent years, display devices for personal computers and television sets are required to be light-weighted and slit Flat panel displays such as a liquid crystal display (LCD), which satisfies such requirements, instead of a cathode ray tube ("CRT") are developed and put into practice in a variety of fields such as a display device for computer, a liquid crystal television.

An LCD includes a panel having a plurality of pixels arranged in a matrix and a panel opposite thereto. Liquid crystal material with anisotropic dielectric is interposed between the panels. An electric field is applied therebetween, and a desired image is displayed by adjusting the strength of the electric field to control the amount of light passing through the panels.

An LCD used for a television set is required to display moving pictures rather than still pictures. However, the LCD is disadvantageous in displaying the moving picture due to its display characteristics. For example, a voltage is applied for a part of one frame, i.e., one horizontal period to generate an electric filed, which is applied to the liquid crystal to respond thereto substantially in the horizontal period and to remain its state during one frame. When the strength of the electric field is changed upon the change of the frames, a drag phenomenon occurs on screen of the LCD due to a long response time of the liquid crystal. That is, the display characteristic of the LCD for the moving picture is inferior due to the long response time of the liquid crystal. Thus, such image characteristic of the LCD needs to be improved for use in a television set, etc., which necessary processes a large amount of moving pictures. In recent years, a method of driving a backlight with a predetermined on/off duty ratio during a frame has been proposed like dot scanning of the television set.

In addition, a typical LCD keeps the luminance of the backlight constant regardless of gray levels of image data. When the image data with high gray levels is localized on a screen or most of the image data on a screen have high gray levels, appropriate luminance control of the backlight depending on the image data can improve the contrast of the display device. That is, it is required to control the backlight depending on the gray levels of the image data.

However, an LCD adapted to both the backlight control techniques has not been proposed, and the present invention relates to a method implementing both the two techniques in order to improve display characteristics.

SUMMARY OF THE INVENTION

A motivation of the present invention is to solve problems of the conventional art under the above-mentioned technical background and to provide an adaptive backlight control ("ABC") method for controlling the luminance of a backlight based on the image data processed after receiving information of image data, in order to improve the visibility of moving picture.

In particular, a motivation of the present invention is to provide an LCD employing a pulse-width modulation driving and analog driving in generation of a luminance control signal.

A liquid crystal display is provided, which includes: a liquid crystal panel assembly including a plurality of gate lines, a plurality of data lines crossing the gate lines, and a plurality of pixels formed at crossing points of the gate lines and the data lines; a signal controller receiving image data and a synchronization signal from an external graphic source, generating a control signal for driving the liquid crystal panel assembly, and converting format of the image data; a voltage generator generating gray voltages and gate voltages for driving the liquid crystal panel assembly; a gate driver sequentially scanning the gate lines of the liquid crystal panel assembly by unit of horizontal scan period based on the gate voltages; a data driver selecting the gray voltages corresponding to the image data from the signal controller for respective data lines on the liquid crystal panel assembly; an inverter generating a first luminance control signal having an analog value depending on luminance distribution of the image data and a second luminance signal having a pulse duty ratio determined by multiples of a frame frequency, synthesizing the first luminance control signal and the second luminance control signal, and generating a lamp driving signal based on the synthesized signal; and a lamp having on and off states and intensity controlled in response to the driving signal from the inverter.

An inverter according to an embodiment of the present invention includes a first block generating the first luminance control signal having the analog value depending on the luminance distribution of the image data and a second block generating the second luminance control signal having the duty ratio depending on a frequency of the synchronization signal. The inverter synthesizes the luminance control signals generated from the respective blocks, and then, it controls a backlight depending on the synthesized luminance control signal. Accordingly, a liquid crystal display simultaneously employing two backlight control techniques can be provided.

BRIEF DESCRIPTION OF THE DRAWINGS

A more complete appreciation of the invention will be readily apparent as the same becomes better understood by reference to the following detailed description when considered in conjunction with the accompanying drawings, wherein.

Figure 1:
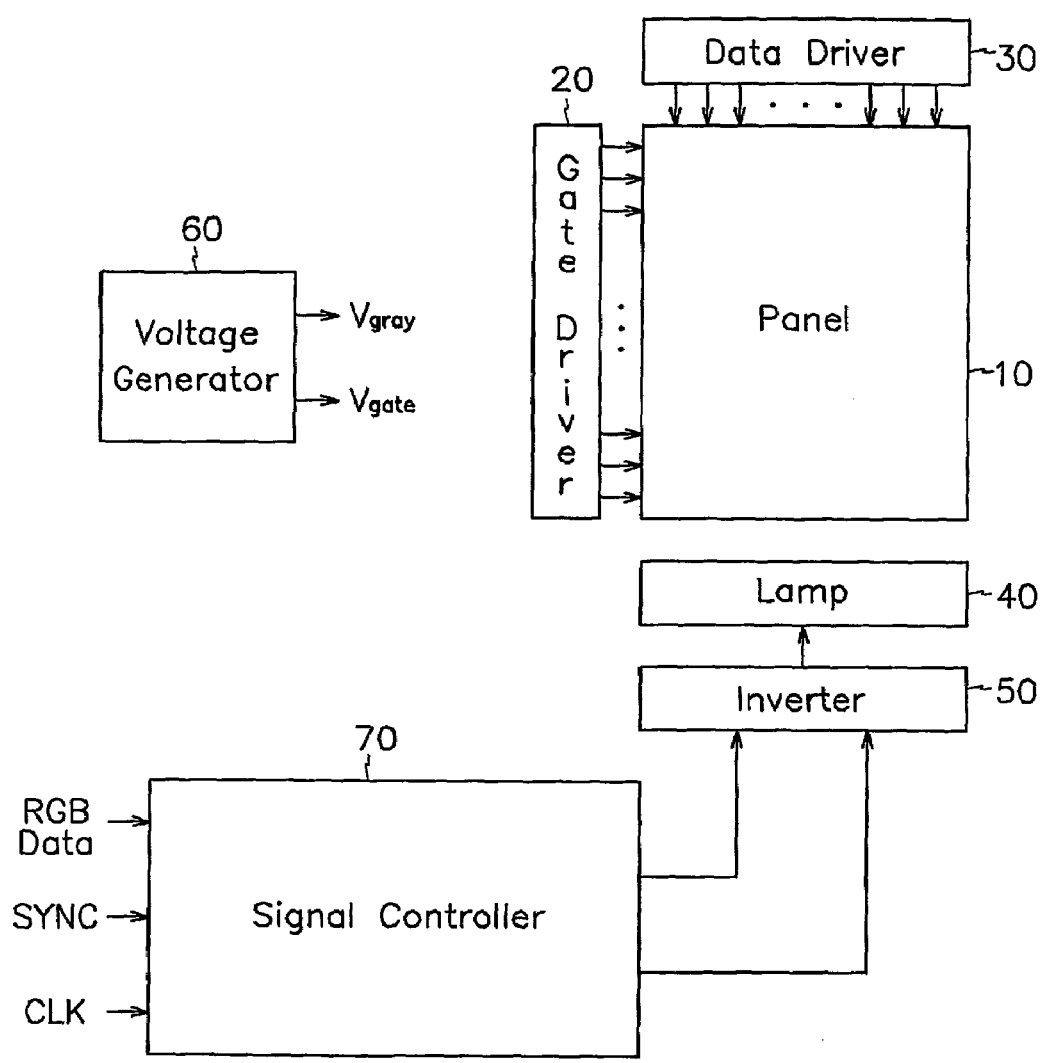
FIG. 1 is a block diagram of an LCD according to an embodiment of the present invention.

| DESCRIPTION OF REFERENCE NUMERALS | |
|---|---|
| 10: liquid crystal panel assembly | 20: gate driver |
| 30: data driver | 40: backlight |
| 50: inverter | 60: voltage generator |
| 70: signal controller | 51: luminance controller |
| 52: transistor driving unit | 53: lamp driving unit |

DETAILED DESCRIPTION OF EMBODIMENTS

The present invention now will be described more fully hereinafter with reference to the accompanying drawings, in which preferred embodiments of the inventions invention are shown. This invention may, however, be embodied in many different forms and should not be construed as limited to the embodiments set forth herein.

Now, an LCD and a driving method thereof according to embodiments of the present invention will be described in detail with reference to accompanying drawings.

Figure 2A:
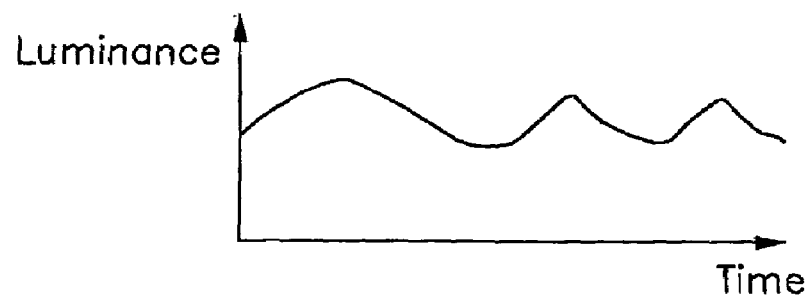
FIGS. 2A to 2C show waveforms of signals used in an LCD shown in FIG. 1.
Figure 2B:
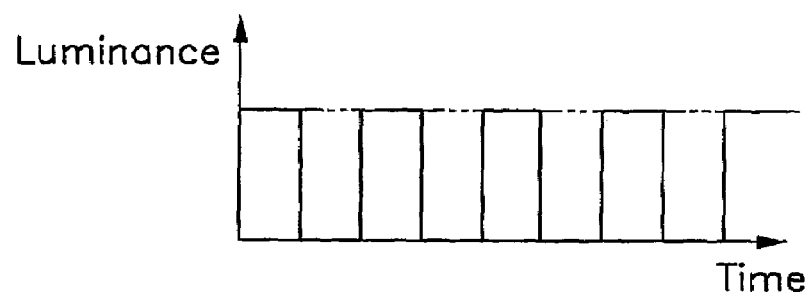
Figure 2C:
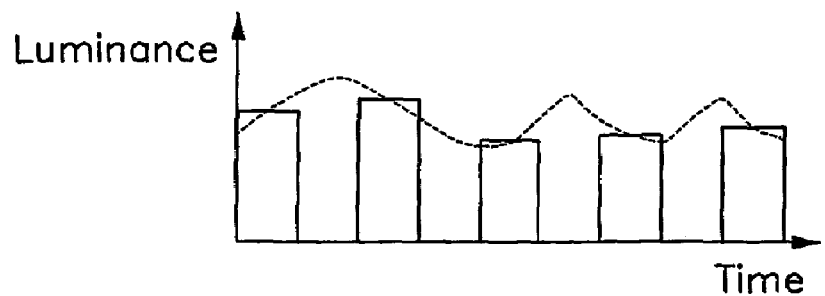

FIG. 1 is a block diagram of an LCD according to an embodiment of the present invention, and FIGS. 2A to 2C show waveforms of signals used in an LCD shown in FIG. 1.

As shown in FIG. 1, an LCD according to an embodiment of the present invention includes a liquid crystal panel assembly 10, a gate driver 20, a data driver 30, a lamp 40, an inverter 50, a voltage generator 60, and a signal controller 70.

Although a detailed configuration of the liquid crystal panel assembly 10 is not shown in FIG. 1, the liquid crystal panel assembly 10 includes a plurality of gate lines, a plurality of data lines crossing the gate lines, and a plurality of pixels formed in areas at intersections of the gate lines and the data lines and arranged in a matrix. Each pixel includes a thin film transistor (TFT) connected to a gate line and a data line, and a pixel capacitor and a storage capacitor connected to a drain electrode of the thin film transistor. When the gate driver 20 applies a gate voltage for selecting a corresponding gate line, thin film transistors connected to the gate line are turned on, and then, the data driver 30 applies data voltages including pixel information to the data lines. The data voltage is applied to the pixel capacitor and the storage capacitor through the thin film transistor of the pixel for driving the capacitors to perform display operation.

The signal controller 70 receives RGB image data RGB Data, synchronization signals SYNC, and a clock CLK from an external graphic source (not shown). The signal controller 70 converts the format of the RGB image data RGB Data in accordance with the data format adapted to the data driver 30, and it generates and outputs control signals used in the gate driver 20 and the data driver 30 for driving the liquid crystal panel assembly 10.

The voltage generator 60 generates and outputs gray voltages Vgray and gate voltages Vgate actually applied to the data lines and the gate lines, respectively. The gray voltages Vgray have a plurality of voltage levels and are transmitted to the data driver 30. The gate voltages Vgate include a gate-on voltage and a gate-off voltage and are transmitted to the gate driver 20.

The gate driver 20 includes a plurality of gate driving ICs in charge of a predetermined number of the gate lines on the liquid crystal panel assembly 10, and it sequentially scans to the gate lines on the liquid crystal panel assembly 10 by unit of one horizontal scan period based on the control signals provided from the signal controller 70 and the gate voltages Vgate provided from the voltage generator 60. For example, the gate driver 20 applies the gate-on voltage to the gate line to be scanned and applies the gate-off voltage to the other gate lines, and the duration of the gate-on voltage is one horizontal scan period. The above-described scan procedure is sequentially performed for all of the gate lines.

The data driver 30 includes a plurality of data driving ICs in charge of a predetermined number of the data lines. The data driver 30 sequentially latches the RGB image data provided from the signal controller 70 to convert data arrangement of a dot at a time scanning into a line at a time scanning. The data driver 30 selects gray voltages matching to the respective image data and simultaneously applies such selected voltages to the respective data lines on the liquid crystal panel assembly 10 as data voltages by unit of one horizontal scan period.

The inverter 50 generates a luminance control signal based on a signal from the signal controller 70 and drives the lamp 40 on the basis of the luminance control signal. In detail, the inverter 50 generates a first luminance control signal having an analog value depending on the luminance distribution of the image data in response to a signal from the signal controller 70 and it also generates a second luminance control signal having a pulse width varying dependent on a signal from the signal controller 70. The inverter 50 synthesizes the first and the second luminance control signals and controls the luminance of the lamp 40 on the basis of the synthesized signal.

FIG. 2A shows a waveform of the first luminance control signal, and FIG. 2B shows a waveform of the second luminance control signal, and FIG. 2C shows a waveform of a synthesized signal of the first and the second luminance control signals.

Next, operation of the inverter 50 will be described with reference to FIG. 3.

Figure 3:
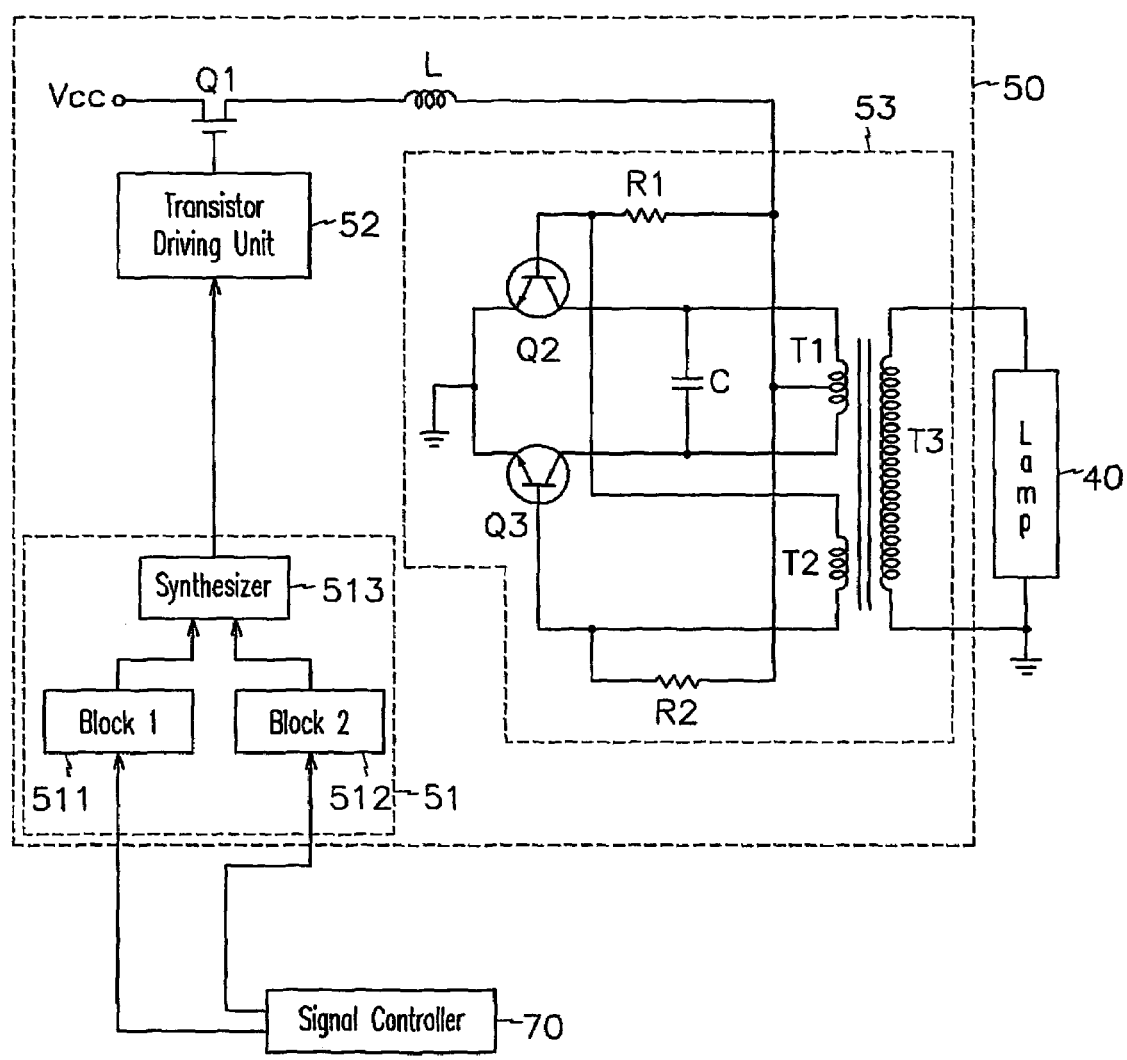
FIG. 3 is a detail diagram of an inverter shown in FIG. 1.

As shown in FIG. 3, an inverter 50 of an LCD according to an embodiment of the present invention includes a luminance controller 51, a transistor driving unit 52, a transistor Q1, a coil L, and a lamp driving unit 53. The luminance controller 51 includes a first block 511 generating a first luminance control signal, a second block 512 generating a second luminance control signal, and a synthesizer 513 synthesizing the signals from the first and the second blocks 511 and 512.

The first block 511 performs analog dimming control and generates a first luminance control signal depending on RGB image data provided from a signal controller 70 by unit of frame. That is, the first block 511 counts the RGB image data in relation to the luminance distribution and calculates the number of the RGB image data representing a predetermined luminance range from the count result. The first block 511, then, generates the first luminance control signal by comparing the calculation with data stored as a reference table. The waveform shown in FIG. 2A is the waveform of the first luminance control signal Meanwhile, a counting unit of the luminance distribution of the RGB image data, i.e., a scaling unit may be one horizontal scan period, but it may be changed by designers depending on system specifications. As shown in FIG. 2A, the first luminance control signal has an analog value as function of time.

The second block 512 performs a pulse width modulation (PWM) dimming control, and generates a pulse signal having a duty ratio dependent on a signal provided from the signal controller 70 as the second luminance control signal. The waveform of the second control signal outputted from the second block is shown in FIG. 2. As shown in FIG. 2B, the second luminance control signal makes the backlight driven in an on-state during a predetermined time of the one horizontal scan period and in an off-state during the remaining time, and the frequency is equal to multiples of a frame frequency, which is a driving frequency of the liquid crystal The synthesizer 513 synthesizes the first luminance control signal and the second luminance control signal, and the waveform of the synthesized signal is shown in FIG. 2C. The synthesized signal has not only an on/off duty ratio but also a magnitude representing the luminance determined by the analog curve shown in FIG. 2A.

The signal from the synthesizer 513 is provided for the transistor driving unit 52 to control the operation of the transistor Q1, and the transistor Q1 controls magnitude of a current provided for the lamp driving unit 53 through the coil L. In detail, the current does not flow into the lamp driving unit 53 when the transistor Q1 is in the off-state, and the magnitude of the current flowing in the lamp driving unit 53 is controlled by the magnitude of the signal outputted from the synthesizer 513 when the transistor Q1 is in the on-state.

The lamp driving unit 53 includes a pair of transistors Q2 and Q3 turning on and off in response to the current supplied through the transistor Q1 and the coil L and a capacitor generating a voltage corresponding to the magnitude of the current. When the current is not supplied, the lamp driving unit 53 generates no voltage. The lamp driving unit 53 further includes a transformer including primary coils T1 and T2 supplied with the generated voltage and a secondary coil for boosting the voltage. Then, the lamp 40 is driven by the high voltage from the secondary coil T3.

Although the lamp driving unit 53 employs a circuit known as a Royer converter, a scope of the present invention is not limited thereto, and it may employ a self-resonated type push-pull converter or an excited type half bridge converter.

As described above, an inverter according to an embodiment of the present invention includes a first block generating a first luminance control signal with an analog value depending on the luminance distribution of image data and a second block generating a second luminance control signal with a predetermined duty ratio based on synchronization signals. The inverter synthesizes the luminance control signals generated from the respective blocks, and then, controls a backlight depending on the synthesized luminance control signal. In this way, two types of backlight controls can be simultaneously adapted to a liquid crystal display. Accordingly, it is possible to remove the drag phenomenon on a display screen and, at the same time, to improve the visibility for moving picture such that the LCD is used in a variety of fields such as a television set, etc., displaying moving pictures. In addition, since the control performed by the second block light on or off the lamp periodically, the total luminance accomplished by the second block is decreased due to the off period. However, in the combination of the control of the second block and the control of the first block, the luminance of the lamp in on state is determined depending on the luminance distribution of the image data based on the first luminance control signal, and thus the luminance decrease of the lamp can be compensated, and consequently the visibility for the moving picture can be improved.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display comprising:
    a liquid crystal panel assembly including a plurality of gate lines, a plurality of data lines crossing the gate lines, and a plurality of pixels formed at crossing points of the gate lines and the data lines;
    a signal controller receiving image data and a synchronization signal from an external graphic source, generating a control signal for driving the liquid crystal panel assembly, and converting format of the image data;
    a voltage generator generating gray voltages and gate voltages for driving the liquid crystal panel assembly;
    a gate driver sequentially scanning the gate lines of the liquid crystal panel assembly by unit of horizontal scan period based on the gate voltages;
    a data driver selecting the gray voltages corresponding to the image data from the signal controller for respective data lines on the liquid crystal panel assembly;
    an inverter generating a first luminance control signal having an analog value depending on luminance distribution of the image data and a second luminance signal having a pulse duty ratio determined by multiples of a frame frequency, synthesizing the first luminance control signal and the second luminance control signal, and generating a lamp driving signal based on the synthesized signal; and
    a lamp having on and off states and intensity controlled in response to the driving signal from the inverter.

2. The liquid crystal display of claim 1, wherein the inverter comprises:
    a first block generating the first luminance control signal having the analog value depending on the luminance distribution of the image data;
    a second block generating the second luminance control signal having the duty ratio depending on a frequency of the synchronization signal; and
    a synthesizer synthesizing the first luminance control signal and the second luminance control signal generated from the first and the second block,
    and the liquid crystal display further comprises:
    a transistor circuit generating a current based on a signal outputted from the synthesizer; and
    a lamp driving unit generating a high-voltage lamp driving signal based on the current supplied from the transistor circuit.

3. The liquid crystal display of claim 2, wherein the first block counts the image data depending on the luminance distribution, calculates the number of the image data representing a predetermined luminance range from the count, and generates a first luminance control signal by comparing the calculation with a stored data in a reference table.

4. The liquid crystal display of claim 3, wherein the first block counts and calculates luminance distribution of the image data by unit of horizontal scan period.

5. The liquid crystal display of claim 2, wherein the first block employs an analog dimming control and the second block employs a pulse-width modulation dimming control.

* * * * *